United States Patent Office 3,148,120
Patented Sept. 8, 1964

3,148,120
HOT AQUEOUS PHENOL EXTRACTION OF GRAM-NEGATIVE BACTERIAL LIPOPOLYSACCHA-RIDES
Otto Westphal, Freiburg im Breisgau, Germany, assignor to Dr. A. Wander Aktiengesellschaft, Bern, Switzerland, a corporation of Switzerland
No Drawing. Filed Nov. 7, 1958, Ser. No. 772,417
Claims priority, application Switzerland Jan. 24, 1952
8 Claims. (Cl. 167—78)

This invention relates to an improved process of preparing pure somatic lipopolysaccharides and more particularly to a process of preparing substantially protein-free, pure lipopolysaccharides derived from microorganisms.

This invention is a continuation-in-part of my copending application Serial No. 332,551, filed January 21, 1953, now abandoned, and entitled "Method of Preparing Substantially Protein-Free Polysaccharides From Microorganisms."

It is known that Gram-negative bacteria contain antigenic complex substances (so-called somatic antigens or endotoxins) which are composed of a species-specific complex phosphorylated polysaccharide, a protein, and a lipid which can be split off comparatively easily, for instance, by the use of suitable organic solvents. It has been found that the above-mentioned species-specific complex phosphorylated polysaccharide is a phosphorylated lipopolysaccharide in which the more firmly bound lipid component differs markedly from the above mentioned readily split off kephalin-like lipid. In order to more clearly distinguish the two lipid components of the whole antigenic complex, the readily split off kephalin-like is designated as lip B while the more firmly bound lipid is termed lipid A.

The composition of such antigenic complex substances derived from Gram-negative bacteria may be illustrated by the following diagram in order to facilitate an understanding of the present invention:

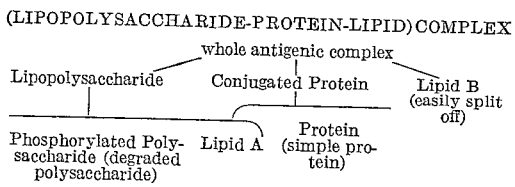

The term "lipopolysaccharide" used hereinafter in the specification and claims does not refer to substances containing lipid B and/or protein but solely to the lipopolysaccharide compound of phosphorylated polysaccharide and lipid A.

Various methods are known to isolate antigenic complex substances largely carbohydrate in nature from an aqueous extract obtained by repeatedly treating Gram-negative bacteria with 88% phenol, or, better still, with 95% phenol and subsequently with physiological saline solution. See, for instance, J. W. Palmer and T. D. Gerlough, "Science," vol. 92, page 155 (1940). It is furthermore known to prepare such antigenic complex polysaccharides in one operation by treating bacteria with phenol-water emulsions in the cold, de-emulsifying said emulsions, and isolating the complex polysaccharide from the aqueous phase. See, for instance, O. Westphal, "Angewandte Chemie," vol. 57, pages 57, 128 (1944); vol. 62, page 27 (1950). The products obtained by said fractionation and extraction processes, however, are not pure lipopolysaccharides, but contain the specific bacterial lipopolysaccharides in chemical combination with larger or smaller amounts of protein and lipid B.

As far as the above mentioned components and their composition were known, the nomenclature and terminology used hereinafter correspond to that suggested by W. T. J. Morgan et al. "Biochemical Journal," vol. 34, page 169 (1940); vol. 35, page 1140 (1941); and "British Journal of Experimental Pathology," vol. 23, page 51 (1942).

It is one object of this invention to provide a simple and effective process of producing lipopolysaccharides from Gram-negative bacteria in an almost quantitative yield and in a substantially protein and lipid B-free and undegraded form.

Another object of this invention is to provide substantially protein and lipid B-free lipopolysaccharides derived from Gram-negative bacterial, said lipopolysaccharides being substantially unaffected and undegraded by such a process of manufacture.

A further object of this invention is to provide therapeutically useful preparations, which exert various biological activities after injection into experimental animals and humans, for instance, (a) Stimulation of non-specific defense mechanisms of the body against infections and other irritations,
(b) Changes in properdin level,
(c) Activation of enzymatic activities, such as proteolysis, especially fibrinolysis,
(d) Activation of hormonal mechanisms, such as connected with the output of adrenal corticoids etc.

Other objects of this invention together with some of the advantageous features thereof will appear from the following description of a preferred mode as well as certain modified modes of practicing the improved process according to this invention to afford the improved lipopolysaccharide obtained thereby. It is to be understood, of course, that this invention is not limited to the precise mode of manufacture hereinafter described nor to the precise mode of working up and purifying the crude lipopolysaccharides obtained thereby, as the invention as defined in the appended claims can be embodied in a plurality and variety of forms and can be practiced in a plurality and variety of ways.

The process according to this invention consists in principle in extracting Gram-negative bacteria and especially those of the Enterobacteriaceae family, at a temperature above about 60° C., with a homogeneous mixture of phenol and water as formed at such elevated temperature, cooling said mixture whereby separation thereof into an aqueous phase and a phenolic phase takes place, and separating the aqueous phase from the phenolic phase and the insoluble residue. The aqueous extract obtained in this manner is for all practical purposes free of protein and lipid B and contains the specific lipopolysaccharide in undegraded form. The yield is almost quantitative.

The new process is based on the fact that phenol-water mixtures which are homogeneous at temperatures above about 60° C. separate on cooling to a temperature below about 40° C. and lower and form two phases: An upper aqueous layer containing a small amount of phenol dissolved therein, and a lower phenolic layer containing a certain amount of water dissolved therein. For instance, when cooling the mixture to a temperature of about 10° C., the upper aqueous layer contains 5–10% of phenol and the lower phenolic layer about 25% of water.

On extracting the Gram-negative bacteria with a homogeneous phenol-water mixture at a temperature above about 60° C., about 40% of the dry weight of the bacteria comprising the whole somatic antigenic complex substance or endotoxin of the respective strain in mixture with the bacterial nucleic acids are dissolved in said homogenous phenol-water mixture. Under these conditions the whole antigenic complex is dissociated into protein, lipid B, and undegraded specific lipopolysaccharide. On cooling, only the lipopolysaccharide enters the aqueous phase while protein and lipid B remain in the phenolic phase. The soluble nucleic acids are also found in the aqueous phase.

When using the known extraction process of Palmer and Gerlough according to which the bacteria are first extracted with 88–95% phenol and, after removal of the phenol extract, with physiological saline, the resulting aqueous solution contains complex antigenic polysaccharide material and protein firmly bound thereto. Only the lipid B is completely separated from the complex polysaccharide. The yield is not at all quantitative. Therefore, the process must be repeated several times.

Palmer and Gerlough produce substances, for instance, from typhoid bacilli which contain 3.4–3.6% of nitrogen. Less than 10% of such nitrogen accounts for hexosamine. Palmer and Gerlough do not indicate the nature of the remaining 90% of nitrogen. Although Palmer and Gerlough state that their product gives a negative or very faint biuret reation, most of the nitrogen found accounts for proteinic nitrogen. In such preparations a negative biuret test, however, is no indication for the absence of protein. On the contrary, it can be readily demonstrated that the Palmer and Gerlough products contain at least 10–15% firmly bound protein. After prolonged hydrolysis with strong mineral acids, a corresponding amount of amino acids is set free. The detection of bound protein components in such complex polysaccharide material by the usual and also sensitive analytical procedures has often been shown to be very difficult as is known to the person skilled in this art. See, for instance, W. T. J. Morgan, "Biochemical Journal," vol. 31, page 2007 (1937); W. T. J. Morgan and S. M. Partridge, "Biochemical Journal," 35, page 1153 (1941). This is the reason why, for instance, A. Boivin, the discoverer of purified endotoxin extracts of Gram-negative bacteria, initially did not detect the presence of protein in his products which he originally designated as "non-proteinous glycolipids." Only after extensively working for more than 10 years in this field, he finally stated that these complexes should preferably be designated as "glycolipidic polypeptides" (see A. Boivin, "Schweizer Zeitschrift fuer Pathologie und Bakteriologie," vol. 5 (1946), page 517). Morgan found that the "polypeptide" component is actually a typical protein (see, for instance, Morgan et al., "Biochem. Journal," vol. 35, page 1140 (1941), especially page 1159).

In contrast to the known complex polysaccharide material prepared according to such authors, the new process, for the first time, permits the preparation of a lipopolysaccharide substantially free of protein, i.e. containing less than about 0.2% of total protein. Substantially all the nitrogen present in such compounds accounts for hexosamine- and lipid-nitrogen.

According to the process of this invention the dried Gram-negative bacteria or the moist sediment obtained from bacterial cultures and the like, are suspended in water and the suspension is heated, while stirring, to a temperature above about 60° C. A temperature of about 70° C. should not be exceeded since at higher temperature the degree of dissociation of phenol as an acid is increased and, therefore the acidic character of the homogeneous phenol-water mixture is more pronounced causing undesired and uncontrollable hydrolysis and dissociation. The preferred temperature is a temperature between about 65° C. and about 68° C.

To the heated aqueous suspension of the respective microorganisms, there is added an amount of phenol, preferably of liquid phenol, such as 90% phenol, which is miscible with the aqueous suspension at said temperature. The phenol, before it is added, is heated to the same temperature as that of the suspension. The pre-heated phenol is preferably added to the suspension in an amount corresponding, by volume, to the amount of said aqueous suspension. The ratio of phenol and water in the homogeneous mixture is between about 37.0% and about 50.0% of phenol to about 63.0% and about 50.0% of water, respectively. The preferred mixture contains about 45% of phenol and about 55% of water. Mixtures containing not less than about 37.0% of phenol and not more than about 50.0% of phenol have proved to be of particular advantage because they yield, on cooling, the proper proportion of phenol layer to water layer. If less phenol is used than about 37%, the phenol layer obtained on cooling is too small and some of the protein remains in the aqueous layer and, due to the low temperature, again recombines with the lipopolysaccharide. If more phenol is used than about 50%, the aqueous layer obtained on cooling is too small and not all of the crude lipopolysaccharide consisting of the lipopolysaccharide and nucleic acids is dissolved and the yield of lipopolysaccharide is decreased considerably.

85% phenol and phenol of higher concentration does not separate into an upper aqueous layer and a lower phenol layer and, consequently, the resulting crude lipopolysaccharide cannot be separated from the protein. A satisfactory lipopolysaccharide of sufficient purity is obtained in one single operation only when using the above mentioned phenol-water mixture containing 37% to 50% of phenol which starts to separate into two layers at a temperature of about 40° C. and which, on cooling, yields proper proportion of the volume of the phenol layer to the aqueous layer.

The homogeneous phenol-water mixture is allowed to contact the microorganisms at said elevated temperature for a comparatively short period of time while stirring. A period of contact between about 5 minutes and about 30 minutes has always proved to be satisfactory.

Thereafter the mixture is cooled, preferably to 5° C. to 10° C. whereby separation into the aqueous phase and the phenolic phase takes place. Centrifuging causes clear separation of said layers into an upper aqueous layer and a lower phenolic layer. The aqueous solution is removed and is freed of dissolved phenol, for instance, by dialysis or by extraction with a suitable water immiscible organic solvent, such as ether, and is concentrated by evaporation, preferably in a vacuum.

On pouring the resulting concentrated aqueous extract into several times its amount by volume of a water miscible organic precipitating agent, such as a lower aliphatic alcohol or ketone or a mixture thereof, for instance, into methanol, ethanol, acetone, a flocculent precipitate is obtained which represents the protein-free specific somatic lipopolysaccharide of the microorganisms used as starting material. Preferably, sodium acetate or other alkali acetates are added to the precipitating solvent to facilitate flocculation.

The resulting lipopolysaccharide is still contaminated with nucleic acids. While the preceding steps are based on a chemical dissociation, distribution of the resulting dissociation products between the aqueous layer and the phenolic layer, the following steps represent merely physical fractionation and purification methods. According to such methods, the lipopolysaccharide is freed of said contaminating nucleic acids, for instance, by repeated fractional precipitation of concentrated aqueous solutions of the crude product by means of water miscible organic solvents, such as ethanol, whereby the nucleic acids are selectively precipitated. They are, for instance, difficultly soluble in about 50% ethanol while the lipopolysaccharide is readily soluble therein. The lipopolysaccharide, in turn, is precipitated, preferably after concentration by evaporation in a vacuum, by the addition of its concentrated solution to several times its volume of the above mentioned water miscible organic precipitating solvents, such as ethanol.

A preferred method of removing contaminating nucleic acids from the lipopolysaccharide consists in subjecting the aqueous solution of the lipopolysaccharide to fractional precipitation, for instance, by adding a water soluble organic solvent, preferably ethanol, to the lipopolysaccharide solution until the ethanol concentration of the mixture is about 50%. The precipitated nucleic acids are removed by centrifuging. The resulting solution is added to several times its volume of ethanol or the like water miscible precipitating solvent whereby the lipopolysaccharide precipitates. It is separated by centrifuging, dissolved in water to form a dilute solution, preferably a solution of about 4% thereof. The slightly opalescent solution is subjected to centrifugation at high speed, for instance, at about 100,000 g. for one to several hours. The lipopolysaccharide free of nucleic acids is obtained as a jelly colorless sediment.

Another method of separating the nucleic acids from the crude lipopolysaccharide consists in subjecting an aqueous solution of the crude lipopolysaccharide to high speed centrifuging, for instance, at about 100,000 g. for a sufficient period of time. Thereby, two layers are obtained, a clear aqueous layer containing more than 95% of the nucleic acids and a clear oily sediment of pellets of the lipopolysaccharide. On repeating such high speed centrifuging, the residual nucleic acids are removed from the lipopolysaccharide which is obtained in this manner in the pure state free of protein and nucleic acids.

It is also possible to remove the nucleic acids from the lipopolysaccharide by electrophoresis. The electrophoretic migration velocity of 0.8% solutions of the lipopolysaccharides in barbital buffer solutions of a pH of 8.6 is approximately the same for all lipopolysaccharides, namely $2.10^{-5}$ sq. cm./volt sec. on anodic migration. All lipopolysaccharides are electrophoretically uniform and exhibit a well defined gradient.

The phosphorylated polysaccharide component of the new lipopolysaccharide according to the present invention is specific to the species of bacteria from which it is obtained. The lipid A is of phospholipid nature. The approximate composition of the bacterial lipopolysaccharide-protein-lipid complex representing the whole antigenic complex is about as follows:

About 45% to 60% of phosphorylated polysaccharide,
About 5% to 15% of phospholipid A, both combined representing the lipopolysaccharide of the present invention,
About 15% to 20% of conjugated protein, and
About 10% of phospholipid B.

The polysaccharide component does not contain uronic acids. The lipid A component can readily be split off from the lipopolysaccharide according to the present invention by hydrolysis by means of N mineral acids at 100° C. Said lipid A component precipitates in the form of white flakes of the following characteristic composition:

| | Percent |
|---|---|
| C | 61.0 to 63.0 |
| H | 9.3 to 9.5 |
| N | 1.5 to 2.0 |
| P | 2.0 to 2.5 |

The lipopolysaccharide contains between about 20% and about 40% and in most instances between about 25% and about 30% of said lipid A. Lipid A can readily be differentiated from other lipids by its insolubility in all typical lipid solvents with the exception of chloroform and pyridine wherein it is readily soluble.

The new lipopolysaccharides differ from all the so-called lipopolysaccharides prepared from bacteria by the absence of proteins the presence of which can be demonstarted in all the heretofore known lipopolysaccharides.

The following examples serve to illustrate the present invention without, however, limiting the same thereto.

EXAMPLE 1

Coli bacteria (*Escherichia coli* serogroup O8 species E. Kroeger) in an amount corresponding to 10 g. of dry substance, are suspended in 350 cc. of water at 65° C. to 68° C. while heating on the water bath. 350 cc. of 90% phenol, previously heated to 68° C., are added to said suspension while stirring. The mixture is kept at 65° C. to 68° C. for 20–30 minutes while stirring, then cooled to 5° C. to 10° C. by means of ice water, and centrifuged. The upper aqueous layer is removed and the lower phenolic layer is again stirred with 300 cc. of water at 68° C. for a few minutes. The mixture is cooled to 5° C. to 10° C. and centrifuged. The aqueous layer is also separated from the phenolic layer. The combined aqueous solutions are dialyzed against distilled water. The nondialyzing inner solution which is faintly opalescent, is concentrated by evaporation in a vacuum to a volume of about 10–15 cc. Small amounts of undissolved particles are removed by centrifuging and the filtrate is poured into 6 to 8 times its volume of 95% ethanol to which about 0.1 g. of sodium acetate were added. A crude lipopolysaccharide precipitates in white floccules. It is washed with alcohol and acetone and is dried in a vacuum. Yield: between about 0.8 g. and about 1.3 g.

4 g. of said crude product are dissolved in 200 cc. of water. 200 cc. of 95% ethanol are added to said solution while stirring. The precipitate is removed by centrifuging. It consists mainly of nucleic acids and amounts to 2.1–2.3 g. The mother liquor is concentrated by evaporation in a vacuum to a volume of about 30 cc. 30 cc. of 95% ethanol are added to said concentrate. 100–150 mg. of a precipitate obtained thereby are removed by centrifuging. The filtrate is allowed to run into 6 times its volume of 95% ethanol to which about 0.1 g. of sodium acetate was added. A fine precipitate is formed which is separated by centrifuging. The precipitate is washed with alcohol and acetone and is dried in a vacuum. It consists of the lipopolysaccharide containing about 5% of nucleic acids. Yield: 1.2–1.4 g.

On repeating said fractionating procedure, 0.9–1.1 g. of the pure somatic lipopolysaccharide are obtained. Its nitrogen content of 0.9–1.3% is entirely due to its content of hexosamine and of lipid nitrogen.

Dissolving said lipopolysaccharide fraction in water to form a 4% solution thereof, yields a faintly opalescent solution. By adding ethanol to said solution in an amount sufficient to produce a solution containing between about 78% and about 82% of ethanol, complete precipitation of the pure lipopolysaccharide takes place.

Instead of drying the crude and the pure lipopolysaccharide in a vacuum, it may be dissolved in water and subjected to freeze drying, i.e. lyophilic drying.

The following comparative experiments shows that extraction by means of aqueous phenol of higher or lower phenol concentration than a concentration between about 37% and about 50% as it is the characteristic feature of the present invention does not yield a protein-free lipopolysaccharide and that the yield is much lower than that achieved when proceeding as described hereinabove in Example 1.

EXAMPLE 1a

*Escherichia coli* O8 bacteria, as used in Example 1, in an amount corresponding to 10 g. of dry substance are extracted with 700 cc. of 65% phenol and the extract is worked up by following the procedure described in said Example 1. 0.4 g. to 0.5 g. of crude lipopolysaccharide are obtained while the yield of crude lipopolysaccharide by extraction with 45% phenol according to the present invention is between about 0.8 g. and about 1.3 g. The crude lipopolysaccharide contains 2.0% of protein nitrogen corresponding to about 13.0% of bound protein. Since 65% phenol separates into a phenol layer and an aqueous layer below 30° C. and since the aqueous layer is much smaller than the phenol layer, dissociation of the lipopolysaccharide-protein complex is incomplete.

EXAMPLE 1b

*Escherichia coli* O8 bacteria, as used in Example 1, is an amount corresponding to 10 g. of dry substance are extracted with 700 cc. of 25% phenol and the extract is worked up by following the procedure described in said Example 1. 7.2 g. of crude lipopolysaccharide are obtained. This product, however, contains 18% to 20% of bound protein. When working with such a low phenol concentration, the phenol layer formed on cooling does not suffice to completely dissolve the dissociated protein.

The method described by Palmer and Gerlough mentioned hereinabove on pages 3 and 6 has also been carried out. The following example clearly shows that the Palmer and Gerlough method which operates with 88% phenol does not produce a protein-free lipopolysaccharide.

EXAMPLE 1c

*Salmonella typhosa* bacteria are extracted by means of 88% phenol according to the Palmer and Gerlough process as described in "Science," vol. 92, page 155 (1940), and U.S. Patent No. 2,340,318. The undissolved residue was treated with a mixture of ethanol and ether and the extract was further purified as described by Palmer and Gerlough. The product was dried by lyophilizing.

An analysis of the dry product obtained in this manner showed the following values calculated for ash-free and moisture-free product:

|  | Percent |
|---|---|
| C | 47.3 |
| H | 6.9 |
| N | 3.2 |
| Glucosamine | 5.2 |

Palmer and Gerlough found, as stated in U.S. Patent No. 2,340,318, page 3, right-hand column, lines 18 to 39: 3.4% to 3.6% N and state that less than 10% of said nitrogen content are accorded for by hexosamine.

The product as prepared according to the above given Example 1c gave only a faint biuret reaction. This fact, however, does not prove the absence of protein as pointed out hereinabove in column 3. When testing the Palmer and Gerlough product according to the Folin-test as modified by B. Lowgrey et al., "J. Biol. Chem.," vol. 193, page 265 (1951), a strongly positive reaction was observed corresponding to a protein content of about 15% of protein. It is evident that the Palmer and Gerlough process of extraction with 88% phenol does not yield a protein-free lipopolysaccharide.

The product obtained according to Palmer and Gerlough differs furthermore from the claimed lipopolysaccharide inasmuch as it is an excellent antigen while the protein-free lipopolysaccharide according to the present invention has only a very weak immunizing power. This is shown by the following comparative experiments:

25 μg. of the Palmer and Gerlough product are administered by intravenous injection to 3 rabbits of the same race. The injections were repeated three times in intervals of 3 to 4 days. Another group of three rabbits of the same race was injected in the same manner with the same amount of a product obtained according to the process of Example 1. 7 days after the last injection the following agglutination titers against *Salmonella typhosa* were determined:

Product according to
Palmer and Gerlough (3.2% N):
   1:2,500   1:2,500   1:5,000
Lipopolysaccharide according
to the present invention
(0.7% N):
   1:80   1:160   1:320

Robinson and Flusser "J. Biol. Chem.," vol. 53, pages 529–534 (1944), describe also a process whereby 95% phenol is used and a polysaccharide is obtained by repeated precipitation by means of such a highly concentrated phenol. Thereby, a substantially protein-free polysaccharide is obtained, since the final products are nitrogen-free. However, the products are also substantially free of lipid A. In contrast thereto the presence of lipid A in the lipopolysaccharide is an essential feature of the lipopolysaccharide obtained according to the present invention since said lipid A is to a large extent responsible for the therapeutically useful stimulating effects of said lipopolysaccharides.

The following tests were made in order to determine the pyrogenic effect (as an indication of the biological activity) of the polysaccharide obtained according to Robinson and Flusser and of the lipopolysaccharide according to the present invention. The lowest pyrogenic dose which causes, on intravenous injection, an increase in the body temperature of rabbits by 0.6° C., was determined as follows:

μg./kg.

(1) Polysaccharide according to Robinson
    and Flusser (Tables II and III, pages
    532, 533) _____ 0.25 to 1.0
(2) Lipopolysaccharide according to the
    present invention _____ 0.001 to 0.004

It is evident that the lipopolysaccharides according to the present invention are more than 100 times as pyrogenic as the Robinson and Flusser polysaccharides and are chemically as well as biologically different therefrom.

Likewise, the polysaccharides obtained according to Co Tui et al., "J. Lab. Clin. Med.," vol. 29, pages 58 to 62 (1944), which are prepared in a similar manner as the Robinson and Flusser polysaccharides by repeated phenol precipitation, are also dissociated to a large extent and do not represent lipopolysaccharides as they are obtained according to the present invention. The following products obtained from *Salmonella typhosa* were tested for their pyrogenic activity and the lowest pyrogenic dose which, on intravenous administration causes an increase in the body temperature of rabbits by 0.6° C., was determined as follows:

μg./kg.

Co Tui et al. product from *S. typhosa* (Table 3
   on page 60) _____ 0.06
Lipopolysaccharide according to the present invention from *S. typhosa* _____ 0.0019

The Co Tui et al. product is about 30 times less pyrogenically effective than the lipopolysaccharide according to the present invention, thus, proving that considerable degradation has taken place when proceeding according to Co Tui et al.

When using, in place of *coli* bacteria, other bacteria of the family Enterobacteriaceae in corresponding amounts and otherwise following the procedure described hereinabove in Example 1, the following yields of crude and purified lipopolysaccharides are obtained:

Table I

| Example No. | Species Enterobacteriaceae | Dry starting material, g. | Yield of lipopolysaccharide | |
|---|---|---|---|---|
| | | | Crude, g. | Purified, g. |
| 2 | Salmonella abortus-equi | 10 | 1.0 | [1] 0.31 |
| 3 | Salmonella typhosa O/901 | 10 | 1.2 | 0.32 |
| 4 | Arizona N99 | 10 | 1.1 | 0.43 |
| 5 | Shigella sonnei | 10 | 1.4 | 0.30 |
| 6 | Escherichia coli O8 | 10 | 1.3 | [2] 0.36 |
| 7 | Escherichia freundii O/67 | 10 | 1.1 | 0.40 |
| 8 | Proteus vulgaris OX19 | 10 | 1.1 | 0.29 |

[1] The yield of 54 experiments was between 0.24 g. and 0.32 g.
[2] The yield of 29 experiments was between 0.27 g. and 0.40 g.

The following species of the Enterobacteriaceae family are treated in an analogous manner yielding corresponding lipopolysaccharides.

(1) Genus Salmonella:
Salmonella enteritidis
  (a) O smooth variant
  (b) o rough variant
Salmonella schottmuelleri (2) Genus Escherichia:
Escherichia coli O18
  (a) O smiith variant
  (b) o rough variant
Eschericia coli O111
(3) Genus Citrobacter:
Escherichia freundii O72
Escherichia freundii O94
(4) Genus Shigella:
Shigella dysenteriae Other genera of the Enterobacteriaceae family which are not enumerated here, may, of course, also be used. The above mentioned species, however, are the preferred ones because they can readily be cultivated on a large scale in synthetic liquid culture media. In contrast thereto, the bacteria of the genus Klebsiella are difficult to cultivate and the yield of bacterial dry substance is quite low. In general, all Gram-negative bacteria can be subjected to the process according to the present invention whereby in each instance protein-free lipopolysaccharides are obtained in a good yield.

Not only the smooth forms (OS=O smooth) but also the corresponding rough forms (or=o rough) can be subjected to the extraction process described hereinabove. The protein-free lipopolysaccharides are obtained in about the same yield from the OS-form as from the or-form. The polysaccharide component of the or-lipopolysaccharides differs chemically from that of the corresponding OS-lipopolysaccharides, for instance, by the absence of deoxy sugar (see Table III, given hereinafter). As a result thereof the or-lipopolysaccharides do not exhibit the immunological O-specificity of the smooth OS-forms. Furthermore, they are essentially non-antigenic. On injection in humans and animals, however, they produce the same pharmacological endotoxin manifestations as the corresponding OS-lipopolysaccharides.

The following Table II gives analytical data obtained on investigating the various purified lipopolysaccharides. Analysis was carried out with lipopolysaccharides dried in a vacuum over phosphorus pentoxide at a temperature between about 40° C. and about 60° C. and calculated for ash-free substance.

Table II

| Example No. | Species | C | H | N | P | (C—CH$_3$) | Hexosamine | Lipid A,[1] maximum |
|---|---|---|---|---|---|---|---|---|
| | SALMONELLA | | | | | | | |
| 2 | S. abortus-equi | 48.6 | 7.30 | 1.3 | 2.8 | 3.2 | 7.7 | 29 |
| 3 | S. typhosa O901 | 47.0 | 6.87 | 0.7 | 2.1 | 2.0 | 6.5 | |
| | S. enteritidis OS | 48.9 | 7.2 | 1.0 | 2.2 | 3.2 | 7.3 | 30 |
| | S. enteritidis or | 48.6 | 7.2 | 1.3 | 3.0 | 1.9 | 8.3 | 25 |
| | S. schottmuelleri | 48.4 | 7.1 | 1.2 | 2.6 | 3.4 | 7.7 | 28 |
| | ARIZONA | | | | | | | |
| 4 | Arizona N99 | 48.2 | 7.5 | 1.0 | 2.0 | 2.9 | | |
| | SHIGELLA | | | | | | | |
| 5 | Sh. sonnei | 48.3 | 7.3 | 1.1 | 2.2 | | | 25 |
| | ESCHERICHIA | | | | | | | |
| 6 | E. coli O8 | 48.4 | 6.8 | 1.0 | 2.1 | 4.8 | 5.3 | 26 |
| | E. coli O18 OS | 47.2 | 6.0 | 1.4 | 2.6 | 1.9 | | |
| | E. coli O18 or | 47.0 | 5.8 | 1.2 | 1.8 | 1.2 | | |
| | E. coli O111 | 45.7 | 6.75 | 1.1 | 1.8 | 2.2 | 8.5 | 23 |
| | CITROBACTER | | | | | | | |
| 7 | E. freundii O67 | 47.2 | 7.0 | 1.2 | 2.5 | | | 26 |
| | E. freundii O72 | 48.1 | 7.4 | 1.1 | 2.3 | 2.9 | | |
| | E. freundii O94 | 47.5 | 6.9 | 1.2 | 2.6 | | | |
| | PROTEUS | | | | | | | |
| 8 | Proteus vulgaris OX19 | 48.2 | 6.8 | 1.4 | 1.9 | | 9.0 | 25 |

[1] The lipid A was determined by extraction with chloroform of the hydrolysate obtained by heating the lipopolysaccharide at 100° C. with N hydrochloric acid for 30 minutes.

The following Table III gives data about the carbohydrate composition of various lipopolysaccharides. Said data were obtained by hydrolysis which was carried out in the following manner:

The lipopolysaccharide was dissolved in N sulfuric acid and the solution was heated under reflux on the water bath at 95–100° C. for several hours. The sulfuric acid solution was neutralized by the addition of saturated barium hydroxide solution to a pH of 6.0. Precipitated barium sulfate was removed by centrifuging and the remaining clear solution was concentrated by evaporation to a volume of 1 cc., containing about 75 mg. of carbohydrates. The concentrated solution was subjected to paper chromatography and the chromatogram was developed by means of a solvent mixture of butanol, pyridine, and water (3:2:1.5). The following carbohydrates have been found in the chromatogram:

Table III

| Example No. | Species | Galactose | Glucose | Mannose | Xylose | Rhamnose | Abequose or colitose | Tyvelose |
|---|---|---|---|---|---|---|---|---|
| | SALMONELLA | | | | | | | |
| 2 | S. abortus-equi | + | + | + | | + | + | |
| 3 | S. typhosa O901 | + | + | + | | + | | + |
| | S. enteritidis OS | + | + | | | + | | |
| | S. enteritidis or | + | + | + | | | + | |
| | S. schottmuelleri | + | + | + | | + | + | |
| | SHIGELLA | | | | | | | |
| 5 | Sh. sonnei | + | + | | | | | |
| | ESCHERICHIA | | | | | | | |
| 6 | E. coli O8 | + | + | | + | + | | |
| | E. coli O18 OS | + | + | | | + | | |
| | E. coli 18 or | + | + | | | | + | |
| | E. coli O111 | + | + | | | | | |
| | CITROBACTER | | | | | | | |
| 7 | E. freundii O67 | + | + | | | | + | |
| | E. freundii O72 | + | + | | | | | |
| | E. freundii O94 | + | + | | | | | |
| | PROTEUS | | | | | | | |
| 8 | Proteus vulgaris OX19 | + | + | + | | | | |

It is noteworthy that all the lipopolysaccharides tested contain galactose and glucose. The Salmonella lipopolysaccharides are, furthermore, characterized by their mannose and rhamnose content. Of about 50 species of this type only those of group C did not contain rhamnose, while L-fucose replaces rhamnose in group G.

The following Table IV gives the quantitative composition of the lipopolysaccharides obtained according to the present invention from Escherichia coli O8 and Salmonella abortus-equi.

Table IV

| Components | E. coli O8, percent | S. abortus-equi, percent |
|---|---|---|
| Hexosamine | 5 | 8 |
| D-Galactose | 2 | 15 |
| D-Glucose | 10 | 8 |
| D-Mannose | 0 | 10 |
| D-Xylose | 10 | 0 |
| L-Rhamnose | 39 | 11 |
| Abequose | 0 | About 8 |
| Acetyl groups | 2 | 8 |
| Organically bound phosphoric acid ester | 6 | 3 |
| Lipid A (after acid hydrolysis, chloroform-soluble) | About 26 | About 29 |
| | About 100 | About 100 |

The new lipopolysaccharides obtained according to the present invention are characterized by their pyrogenic threshold dose which can be determined readily and very accurately. The minimum pyrogenic dose (MPD) is that dose of the pure lipopolysaccharide which, on intravenous injection in at least three rabbits causes an average increase of the body temperature of 0.6° C. within 3 to 4 hours after the injection. It was found that all the lipopolysaccharides prepared according to the present invention show MPD values of 0.001–0.004 μg./kg.

The MPD on intravenous injection in healthy humans is between about 0.04 μg. and about 0.10 μg. totally, i.e.

0.0008–0.0015 μg./kg.

At the same time there is always observed a slight leukopenia ½ to 2 hours after the injection which is followed by an increase in leucocytes to values of 200% to 300% of the initial values.

The ultraviolet absorption spectra of all the lipopolysaccharides according to the present invention are substantially the same. The pure lipopolysaccharide according to the present invention is characterized by the fact that it does not show absorption between 220 mμ. and 320 mμ. which is present in the ultraviolet absorption spectrum of a lipopolysaccharide according to the prior art which still contains a small amount of nucleic acid, for instance, 4.8% thereof.

The new substantially protein-free and pure lipopolysaccharides obtained according to the present invention produce, on administration to healthy individuals, exceedingly uniform and well reproducible temperature curves, leucocyte reactions, and the like.

In patients there are frequently observed considerable individual differences in reactivity which are dependent on the type of illness to be treated. Therefore, the effective dose must be determined in each case by gradually increasing a minimum initial dose (for instance, an initial total dose between 0.05 μg. and 0.20 μg.). These differences may even be used for diagnostic purposes. However, as soon as the effective dose has been determined, the type of the curves (fever, leucocytes, etc.) is also quite uniform. Thus, for instance, patients which did not show any reaction two to three hours after the injection, do not exhibit such a reaction at a later time. When administering pyrogenic dosages, the body temperature always increases about 1½ hours after the injection, it reaches its maximum within 3 hours to 5 hours, and then it decreases to normal values within a few hours. When administering the lipopolysaccharide early in the morning, for instance, at 8 a.m., the temperature has again returned to normal late in the afternoon. No subsequent fluctuations have been observed. The changes in the leucocyte blood picture show a similar pattern. Maximum leucocytosis is observed in each case near the 8 hour value. In this respect the new protein-free lipopolysaccharides differ advantageously from other bacterial stimulating agents as they have been suggested and used for therapeutical purposes, such as the so-called "polysaccharides" and/or "lipopolysaccharides" which had been prepared heretofore and which either were not sufficiently protein-free or were dissociated too much, i.e. were partly or entirely free of lipid A.

The preferred form of medication is the intravenous injection of aqueous, preferably isotonic saline solutions of said new lipopolysaccharides. Very small amounts of said lipopolysaccharides in saline solution cause a marked increase in body temperature. Especially valuable pyrogenic lipopolysaccharides are obtained, for instance, from *Escherichia coli, Salmonella abortus-equi, Proteus vulgaris*, although other Gram-negative micro-organisms, especially those of the Enterobacteriaceae family are also producing such pyrogens.

Pyrogenic preparations, for instance, the Salmonella abortus equi lipopolysaccharide, containing about $1.0\gamma$ to about $2.0\gamma$ of the new lipopolysaccharides per cc. isotonic saline solution, are administered intravenously in the symptomatic control of such allergic disorders as asthma, hay fever, atopic dermatitis, urticaria, gastorintestinal allergy, fatigue syndrome of allergic origin, and others. Other indications in which administration of the new lipopolysaccharides according to the present invention have proved of value are, for instance, neurolues, progressive paralysis, tabes, and the like, or damage to the tissue with insufficient healing tendency, such as ulcera cruris, chronic peptic duodenal ulcers, colitis ulcerosa, and the like. Such preparations may also be used in the treatment of rheumatic diseases, such as primary chronic as well as secondary chronic polyarthritis and the like.

Initially $0.10\gamma$ to $0.20\gamma$, and in case of patients whose sensitivity is known to be high, even only $0.05\gamma$ are intravenously injected while subsequent doses may be given subcutaneously. Most patients show satisfactory response to doses ranging up to $0.20\gamma$ to $0.50\gamma$ injected two to three times weekly. A maximum dose of $1.0\gamma$ need ordinarily not be exceeded.

An initial dose of $0.25\gamma$ to $0.50\gamma$ usually results in fever with maxima between $38.5°$ C. and $40.0°$ C. and, thus, is of value in neurolues.

On repeating injections of the lipopolysaccharide according to the present invention, slight tolerance effects may occur which differ individually and which is also dependent on the intervals in which injection is repeated. The shorter the intervals, the more pronounced is usually the development of tolerance. If the temperature increase achieved by an injection was sufficiently high, then the subsequent dose is not increased at all or only by $0.1\gamma$. If the febrile reaction is unsatisfactory, the dose may be increased by $0.20\gamma$ to $0.30\gamma$. In general, no further increase of tolerance is observed after 5 to 6 injections, administered in intervals of 3 days, so that the same dose can be administered, should it become necessary to subject the patient to a prolonged treatment.

The lipopolysaccharide preparations according to the present invention have also been used successfully in the treatment of latent and manifest infections, especially if combined with antibiotic and/or chemotherapy.

Treatment with the new lipopolysaccharide has proved of special value in the treatment of acute and subacute forms of adnexitis. While heretofore only about 25% of the patients had been successfully treated after 30 days, this rate of healing has doubled by administration of the lipopolysaccharide.

Lipopolysaccharides have also proved as valuable adjuvants in the treatment of certain forms of pulmonary tuberculosis which did not show any improvement on a combined treatment with chemotherapeutic agents and antibiotics for several months. Frequently additional adminstration of the new lipopolysaccharide daily or every second day in weakly pyrogenic doses for two to three months resulted in a noteworthy clinical improvement. Thick-walled caverns responded especially well to such a combination treatment.

Another very important physiological effect of the new lipopolysaccharides is to be seen in its activation of the fibrinolysis of the blood. Thus, administration of the lipopolysaccharides has also proved of value in the treatment of arterial thrombosis, peripheral embolisms, and thrombophlebitis whereby it is used either as sole medication or in combination with an anticoagulants. The initial intravenous dose of Salmonella abortus equi lipopolysaccharide, for instance, is usually $0.2\gamma$. The lipopoyl-saccharide injection is given at intervals of 2 days whereby the dose preferably is increased by $0.1\gamma$ to $0.2\gamma$ per injection. However, frequently a single injection resulted in complete recovery. The fever and chills accompanying such a treatment may be suppressed by premedication without inhibiting the filbrinolytic activity. Fibrinolysis is detectable in the blood about 1 hour to 1½ hours after injection; it is strongest about 1¾ hours to 2½ hours after injection and gradually disappears in the following 2 to 4 hours. Lipopolysaccharide treatment considerably accelerates healing of such thrombo-embolisms. It causes dissolution of the fibrin when formed and, therefore, supplements the anticoagulant thereapy which inhibits clotting. In severe cases of thrombo-embolism in which the anticoagulants cannot be used because of hemorrhages, lipopolysaccharide treatment may be life-saving.

The new lipopolysaccharides cause leukocytosis even if administered in subpyrogenic doses. As a result thereof they may be used to determine the functioning of the bone marrow by the injection of a subpyrogenic dose which does not burden the patient.

The new lipopolysaccharides, in clinical doses, have also a stimulating effect on the phagoctytic activity of human blood granulocytes.

$0.1\gamma$ to $0.3\gamma$ of the lipopolysaccharide injected intravenously produce in healthy persons and in most instances also in patients a significant increase in the serum properdin level within 6 hours to 24 hours. The increase amounts to 200% to 400% of the initial value and lasts for several days.

Furthermore, the new lipopolysaccharides produce, on intravenous injection, considerably vasoconstriction which sets in about one hour after injection and which is followed after 30 to 60 more minutes by strong vasodilation. Such vasodilation is of advantage in the treatment of thrombo-embolism.

It has been found that intravenous injection is the preferred mode of administration. It is, however, also possible to administer the lipopolysaccharide preparations intramuscularly or subcutaneously. Thereby, the dosage must be increased usually about 10 times.

As stated hereinabove, usually about 1 to 2 hours after administration an increase in body temperature is observed which reaches its maximum value at about 3 to 4 hours whereafter the temperature decreases to normal within about 1 to 2 hours. The temperature increase is frequently accompanied by leukopenia of short duration followed by an increase in the number of leukocytes depending on the dose given. Moderate to pronounced granulocytosis, lymphopenia, and eosinopenia are also observed.

The new lipopolysaccharides according to the present invention are superior to any of the other heretofore used pyrogenic substances by permitting exact dosage so as to achieve readily reproducible physiological and pharmaceutical effects with no or with tolerable side-effects. Another important advantage of the new lipopolysaccharide preparations is that they do not cause sensitization of the patient thereto.

The following examples illustrate the composition of preparations of lipopolysaccharides as they are used in therapy without, however, limiting such preparations thereto.

EXAMPLE 9

2.2 mg. of the lipopolysaccharide of Escherichia coli obtained according to Example 1 are dissolved in 2,200 cc. of twice distilled water. The solution is filtered under sterile conditions and filled into ampoules, each ampoule containing 2.2 cc. The filled ampoules are then sealed. Each ampoule contains $2.2\gamma$ of lipopolysaccharide. If small amounts of $0.2\gamma$ or less are to be injected, it is advisable to dilute the ampoule with 8.8 cc. of twice distilled water. Each cc. of the resulting solution contains $0.2\gamma$ of lipopolysaccharide in 1 cc. of solution.

EXAMPLE 10

0.55 mg. of the lipopolysaccharide of Salmonella abortus-equi obtained according to Example 2, are dissolved in 2,200 cc. of an isotonic sodium lactate buffer solution (pH about 7.0). The solution is filtered under sterile conditions and filled into ampoules, each ampoule containing 2.2 cc. The filled ampoules are then sealed. 1 cc. of the solution contains 0.25γ of lipopolysaccharide.

Of course, many changes and variations in the extraction conditions, the composition of the phenol-water mixture, the temperature and duration of extraction, the methods of working up the aqueous extracts and of purifying the crude lipopolysaccharides, the mode of administration of said lipopolysaccharides in therapy and their use in the preparation of therapeutically valuable and effective products and the like may be made by those skilled in the art in accordance with the principles set forth herein and in the claims annexed hereto.

I claim:

1. In a process of preparing substantially protein-free lipopolysaccharides from Gram-negative bacteria of the Enterobacteriaceae family, the steps comprising treating said bacteria with a phenol-water mixture containing between about 37.0% and about 50.0% of phenol at a temperature between about 60° C. and about 70° C., thereby causing dissociation of the lipopolysaccharide-protein complex compound present in said bacteria, cooling the resulting mixture to a temperature of less than about 40° C. to cause separation of said mixture into an aqueous layer and a phenolic layer, removing said aqueous layer, and isolating from said aqueous layer the substantially protein-free lipopolysaccharide.

2. The process according to claim 1, wherein the bacteria are treated with the phenol-water mixture at a temperature between about 65° C. and about 68° C.

3. The process according to claim 1, wherein the bacteria are treated with the phenol-water mixture for a period of time between about 5 minutes and about 30 minutes.

4. The process according to claim 1, wherein the bacteria treated with the phenol-water mixture are dried bacteria.

5. In a process of preparing substantially protein-free lipopolysaccharides from Gram-negative bacteria of the Enterobacteriaceae family, the steps comprising treating said bacteria with a phenol-water mixture containing between about 37.0% and about 50.0% of phenol at a temperature between about 60° C. and about 70° C., thereby causing dissociation of the lipopolysaccharide-protein complex compound present in said bacteria, cooling the resulting mixture to a temperature of at least about 40° C. to cause separation of said mixture into an aqueous layer and a phenolic layer, removing said aqueous layer, removing dissolved phenol from said aqueous layer, concentrating said aqueous layer by evaporation in a vacuum, pouring said concentrated aqueous layer into a large amount of a water miscible organic solvent selected from the group consisting of lower alkanols and lower alkanones to precipitate the protein-free lipopolysaccharide, and removing said protein-free lipopolysaccharide from the solvent.

6. The process according to claim 5, wherein the water miscible solvent is ethanol.

7. The process according to claim 6, wherein the amount of ethanol added to precipitate the lipopolysaccharide is sufficient to yield an aqueous ethanolic solution of at least about 78% by volume of ethanol.

8. In a process of preparing substantially protein-free lipopolysaccharides from Gram-negative bacteria of the Enterobacteriaceae family, the steps comprising treating said bacteria with a phenol-water mixture containing between about 37.0% and about 50.0% of phenol at a temperature between about 60° C. and about 70° C., thereby causing dissociation of the lipopolysaccharide-protein complex compound present in said bacteria, cooling the resulting mixture to a temperature of at least about 40° C. to cause separation of said mixture into an aqueous layer and a phenolic layer, removing said aqueous layer, removing dissolved phenol from said aqueous layer, concentrating said aqueous layer by evaporation in a vacuum, pouring said concentrated aqueous layer into a large amount of a water miscible organic solvent selected from the group consisting of lower alkanols and lower alkanones to precipitate the protein-free lipopolysaccharide, removing said precipitated lipopolysaccharide from the solvent, and removing from said lipopolysaccharide the nucleic acids present therein.

References Cited in the file of this patent

Kabat et al.: Experimental Immunochemistry, pub. 1948, by Charles C. Thomas, Springfield, Ill., pp. 514–517.

Advances in Carbohydrate Chemistry, vol. 2, 1946, pp. 166, 189, 199–201 and 219–223.

Todd: J. Pharm. and Pharm., pp. 625–641, October 1955.